(12) United States Patent
Kleks et al.

(10) Patent No.: US 8,392,603 B2
(45) Date of Patent: Mar. 5, 2013

(54) FILE TRANSFER

(75) Inventors: Amir Kleks, Hod-HaSharon (IL); Lilach Ofek, Nir Banim (IL)

(73) Assignee: International Business Machines Corporation, Armonk, NY (US)

( * ) Notice: Subject to any disclaimer, the term of this patent is extended or adjusted under 35 U.S.C. 154(b) by 1320 days.

(21) Appl. No.: 11/464,218

(22) Filed: Aug. 14, 2006

(65) Prior Publication Data

US 2008/0040503 A1 Feb. 14, 2008

(51) Int. Cl.
*G06F 15/16* (2006.01)

(52) U.S. Cl. .......................... 709/236; 709/228; 709/230

(58) Field of Classification Search .................. 709/236, 709/228, 230
See application file for complete search history.

(56) References Cited

U.S. PATENT DOCUMENTS

| | | | | |
|---|---|---|---|---|
| 6,088,803 A | * | 7/2000 | Tso et al. | 726/22 |
| 6,546,428 B2 | * | 4/2003 | Baber et al. | 709/232 |
| 7,971,254 B1 | * | 6/2011 | Ji et al. | 726/24 |
| 2002/0178381 A1 | * | 11/2002 | Lee et al. | 713/201 |
| 2004/0181687 A1 | * | 9/2004 | Nachenberg et al. | 713/201 |
| 2005/0149726 A1 | * | 7/2005 | Joshi et al. | 713/164 |
| 2006/0215556 A1 | * | 9/2006 | Wu et al. | 370/230 |

FOREIGN PATENT DOCUMENTS

| EP | 1122932 A2 | 8/2001 |
|---|---|---|
| EP | 1528743 A2 | 5/2005 |

* cited by examiner

*Primary Examiner* — Ashok Patel
*Assistant Examiner* — Lawrence Cosby
(74) *Attorney, Agent, or Firm* — David A. Dagg

(57) ABSTRACT

A method and system for file transfer are provided in which a file is transferred between a source client and a destination client via a middle server. The server receives segments of a file from the source client and stores the segments of the file as they are received. The server also forwards the segments of the file to a destination client as they are received, with the exception of one segment. The server combines the segments to form the whole file and applies a process to the whole file. The process may be for example an authorisation process such as an anti-virus check, a confidentiality check, or a content validity check. If the file passes the process, the remaining excepted segment is forwarded to the destination client.

18 Claims, 6 Drawing Sheets

FILE TRANSFER

FIELD OF THE INVENTION

This invention relates to the field of file transfer over a network. In particular, this invention relates to file transfer over a network in which a process must be carried out on the file before delivery.

BACKGROUND OF THE INVENTION

File transfer between clients across a network may be carried out via a server. This may take place in many different environments. The server receives a file from a source client and forwards it to the destination client. When a file is transferred between clients, the server may carry out some form of process on the file. This process may be, for example, a virus check to make sure that the file is safe to forward to the destination client, a confidentiality check to make sure that the destination client is authorized to receive the file, or any other appropriate process.

Some processes that the server carries out before forwarding a file, must be applied to the file as a whole. In many file transfer situations, the file is split into segments due to a size limitation on the maximum block size that can be sent across a communication means. This results in a delay in the server carrying out the process on the file and forwarding it to the destination client. The server must wait for all the segments of the file to arrive from a source client and the server must re-construct the file before the process can be carried out. Once the process has been successfully completed the file must again be split into segments to transfer it to the destination client.

For example, in an instant messaging environment, a file is transferred between two communicating instant messaging clients via an instant messaging server. The server needs to carry out an anti-virus scan on the file before allowing the transfer to the destination client. Many anti-virus (AV) software packages can only authorize a file as a whole, and cannot carry out the scan successfully on segments of a file. The instant messaging server must wait until all the segments arrive at the server before the scan can take place. The delivery of the file to the destination client is postponed until the file is cleared by the scan. This causes a delay in the file transfer.

SUMMARY OF THE INVENTION

It is an aim of the present invention to provide a method and system for file transfer via a server which must carry out a process on the file, which reduces the delay in the transfer caused by the process.

According to a first aspect of the present invention there is provided a method for file transfer, comprising: receiving segments of a file; storing the segments of the file as they are received; forwarding the segments of the file to a destination client as they are received, excepting at least one segment; combining the segments to form the file; applying a process to the whole file; and if the file passes the process, forwarding the excepted segment to the destination client.

A source client preferably divides the file into segments and transmits the segments to a server. The segments may be forwarded to more than one destination client simultaneously.

The excepted segment may be the last segment to be received. There may be more than one excepted segment. The segments are appended to a file as they are received.

The process may be an authorization process including one of an anti-virus check, a confidentiality check, a content validity check.

The segments may be received out of sequence order in the file and may contain an indication of their position in the file. At least one of the segments may include an indication of the number of segments in the file. The excepted segment which is not to be forwarded on receipt may be identified by a count of segments.

If the file fails the process, the excepted segment is not sent to the destination client and a failure message is sent.

According to a second aspect of the present invention there is provided a computer program product stored on a computer readable storage medium, comprising computer readable program code means for performing the steps of: receiving segments of a file; storing the segments of the file as they are received; forwarding the segments of the file to a destination client as they are received, excepting at least one segment; combining the segments to form the file; applying a process to the whole file; and if the file passes the process, forwarding the excepted segment to the destination client.

According to a third aspect of the present invention there is provided a method of providing a service to a client over a network, the service comprising the method steps of: receiving segments of a file; storing the segments of the file as they are received; forwarding the segments of the file to a destination client as they are received, excepting at least one segment; combining the segments to form the file; applying a process to the whole file; and if the file passes the process, forwarding the excepted segment to the destination client.

According to a fourth aspect of the present invention there is provided a system for file transfer comprising: a source client including dividing means for dividing a file into segments, and transmitting means for transmitting file segments; a destination client including receiving means for receiving file segments; and a middle server including receiving means for receiving file segments from the source client, a store for storing file segments as they are received, forwarding means for transmitting file segments to the destination client as they are received, means for identifying one segment which is not forwarded to the destination client on receipt, and re-combining means for combining the file segments into the whole file, and a file processing means for applying a process to the whole file.

The middle server may include a dividing means for dividing the whole file into segments once it has passed the process. The dividing means of the source client and the middle server preferably use the same dividing method to provide the same file segments. The destination client may also include a re-combining means for combining the file segments into the whole file.

There may be more than one destination client and the middle server may forward the file segments to the destination clients simultaneously.

In one embodiment, system may be an instant messaging system and the source and destination clients may be instant messaging clients. In another embodiment, the system may be a file sharing system and the source and destination clients may be file sharing applications. In a further embodiment, the system may be a file replication system and the middle server is a replication server. In yet another embodiment, the system is an email system and the middle server is an email server.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are provided for file transfer between computer entities over a network via a server. The environment of the file transfer may take many forms and the invention is applicable to any form of file transfer in which the file is split into segments for transfer and the transfer is via a server which carries out a process on the whole file.

A file may be any form of a collection of data or one or more programs. For example, a file may be a program, graphics, text, media such as sound and music, etc. The described method and system are suitable for non-streamable files, in which the entire file must be received before it can be accessed or used.

Figure 1A:
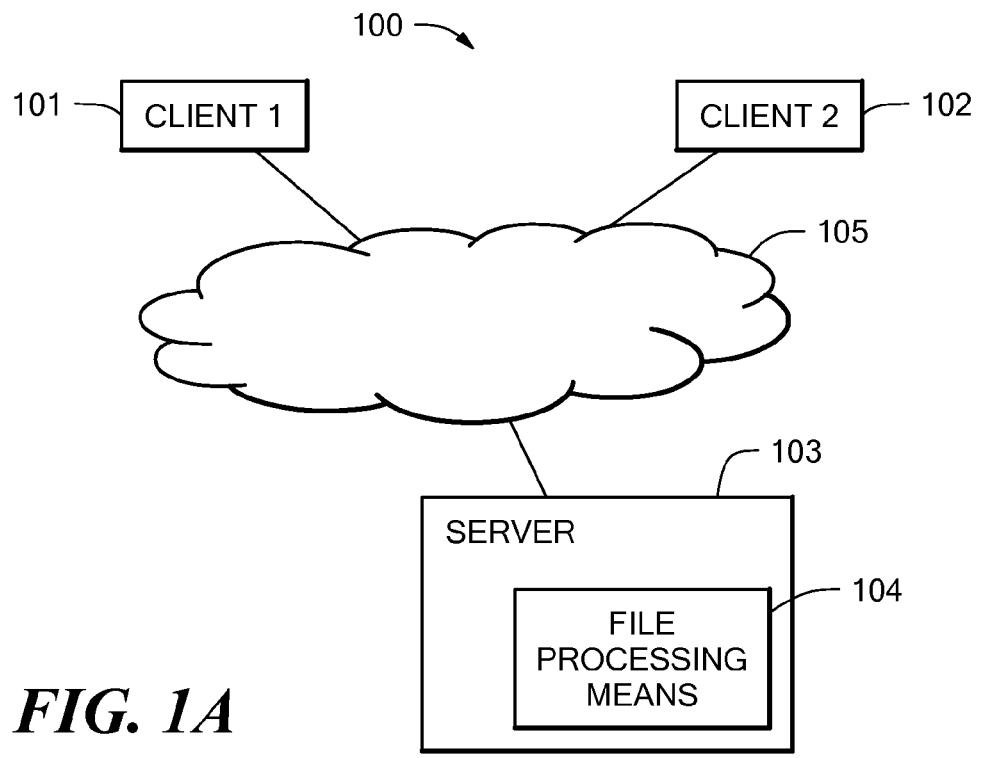
FIGS. 1A and 1B are block diagrams of a system in accordance with the present invention.

FIG. 1A shows a system 100 with a first client 101, a second client 102, and a middle server 103. The clients 101, 102 communicate via the server 103 with communications made via a network 105. The network may be any form of network including a LAN (local area network), a WAN (wide area network), a wireless network, an Intranet, the Internet, or any combination of such networks. The server 103 includes a file processing means 104 which is operable to carry out some form of process on a file transferred via the server 103 from a source client 101 to a destination client 102.

In one embodiment, a file may be transferred from the source client 101 to multiple destination clients 102 simultaneously with the process being carried out once by the server 103 before forwarding the file to the multiple destination clients 102. In another embodiment, the source and destination clients 101, 102 may be the same entity, with the server 103 carrying out the process before returning the file to the client.

An example environment in which the invention may be applied, is an instant messaging environment. In an instant messaging environment, the clients 101, 102 communicate in real time via an instant messaging server 103. Each of the clients 101, 102 runs a client application. The server 103 runs the instant messaging services of login and authentication of clients, connection, and routing of messages between clients.

Another example environment in which the invention may be applied, is file transfers on replication servers in which the server 103 of FIG. 1A is a replication server.

A further example environment in which the invention may be applied, is non-peer to peer file sharing applications 101, 102 which transfer files via a server 103.

A yet further example environment in which the invention may be applied, is an email server 103 for file transfer between email clients 101, 102.

The above are example environments in which the invention may be applied; however, any client/server architecture where files are transferred via a middle server may use the described method.

A source client 101 may transfer a file to one or more destination clients 102. The file is split into segments at the source client 101 and the segments are sent individually across the communication channel to the server 103. Files are split into segments due to size limitations of blocks sent across the communication channel.

The file segments are received at the server 103 and joined together to re-form the file. The server 103 forwards the segments upon their receipt at the server 103 to the destination client 102, with the exception of at least one segment. The excepted segment is held back at the server 103 until the server 103 has carried out any required process or processes on the file. The destination client 102 cannot re-form the whole file until the excepted segment has been forwarded from the server 103 and received at the destination client 102. The server 103 may, if appropriate, hold back more than one segment until the process has been carried out. However, the majority of the segments are sent to the destination client 102 before or during the processing of the file by the server 103.

A method and system of file transfer are described in which file segments sent from a source client 101 are received on the server 103, re-constructed to form the file and a process carried out on the whole file. As the individual segments are received on the server 103, they are stored on the server 103. The individual segments, up until the last segment of the file to be received, are also immediately sent by the server 103 to the destination client 102. When all the segments of the file have been received on the server 103 and the segments combined to re-construct the file, the process is carried out by the server 103 on the file. Only when the file passes the process, is the remaining segment sent by the server 103 to the destination client 102.

The excepted segment which is not sent to the destination client 102 upon its receipt at the server 103, may be the last segment to be received at the server 103. Alternatively, the excepted segment may be the first segment to be received at the server 103 or another designated segment from within the file.

The server 103 may carry out one or more processes on the file before forwarding it to the destination client 102 or clients. The process may be an authorization, security, or content checking process. In one example, the process may be a confidentiality check that the file does not contain confidential information that the destination client is not entitled to receive, or to check that the destination client has the required confidentiality clearance for the file. In another example, the process is an anti-virus scan to ensure that the file does not contain a virus that would contaminate the destination client's computer system. Another example, is a process for checking the validity of the content of the file. Other forms of suitable process that may also be carried out by the server 103 will be apparent to a person skilled in the art. Such processes often require the whole file to be received on the server 103 before the process can be carried out. Therefore, file segments received at the server 103 from the source client 101 must be re-constructed into the file at the server 103 before the process is carried out.

Figure 1B:
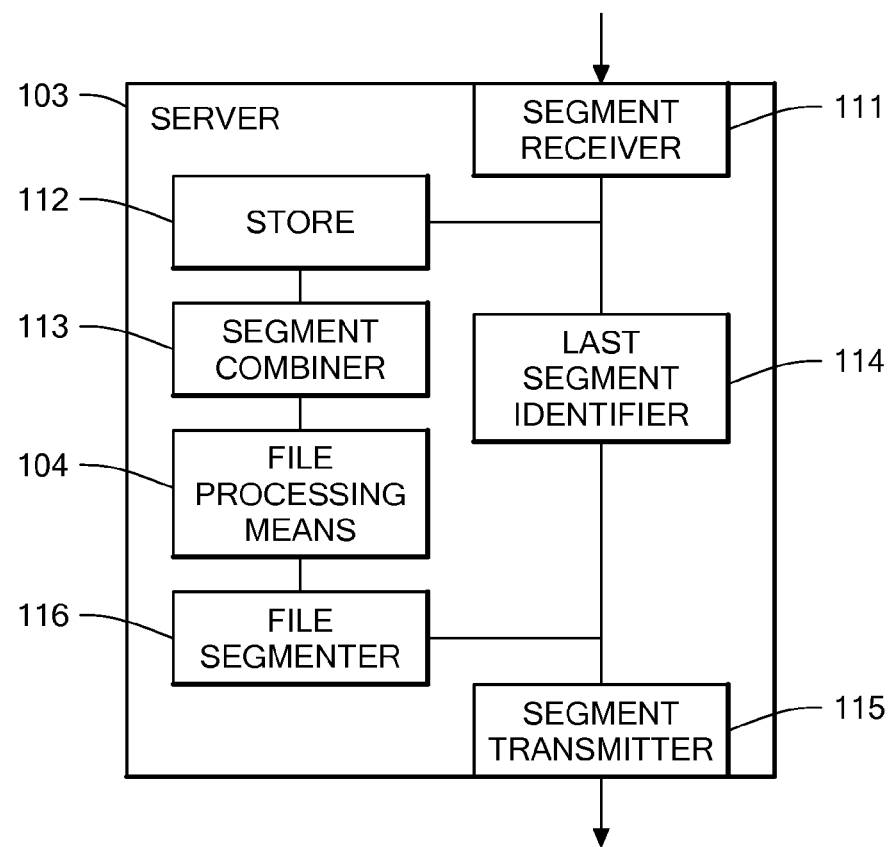

FIG. 1B provides more detail of the components of the server 103 used in the described system. The server 103 includes a segment receiver 111 and a store 112 for storing the received segments. A segment combiner 113 recombines the segments to form the file. A last segment identifier 114 identifies the last segment of a file to be received. The last segment identifier 114 may be, for example, a counter wherein there are a known number of segments. Another example of identifying the last segment may be by determining that a single segment remains to be combined by the segment combiner 113. A segment transmitter 115 sends the segments to the destination client. The file processing means 104 receives the whole file from the segment combiner 113. A file segmentor 116 re-segments the file once it has been processed. The clients 101, 102 shown in FIG. 1A also include file segmentors and segment re-combiners for sending and receiving the file. The source client 101 and the server 103 divide the file into the same form of segments.

Figure 2:
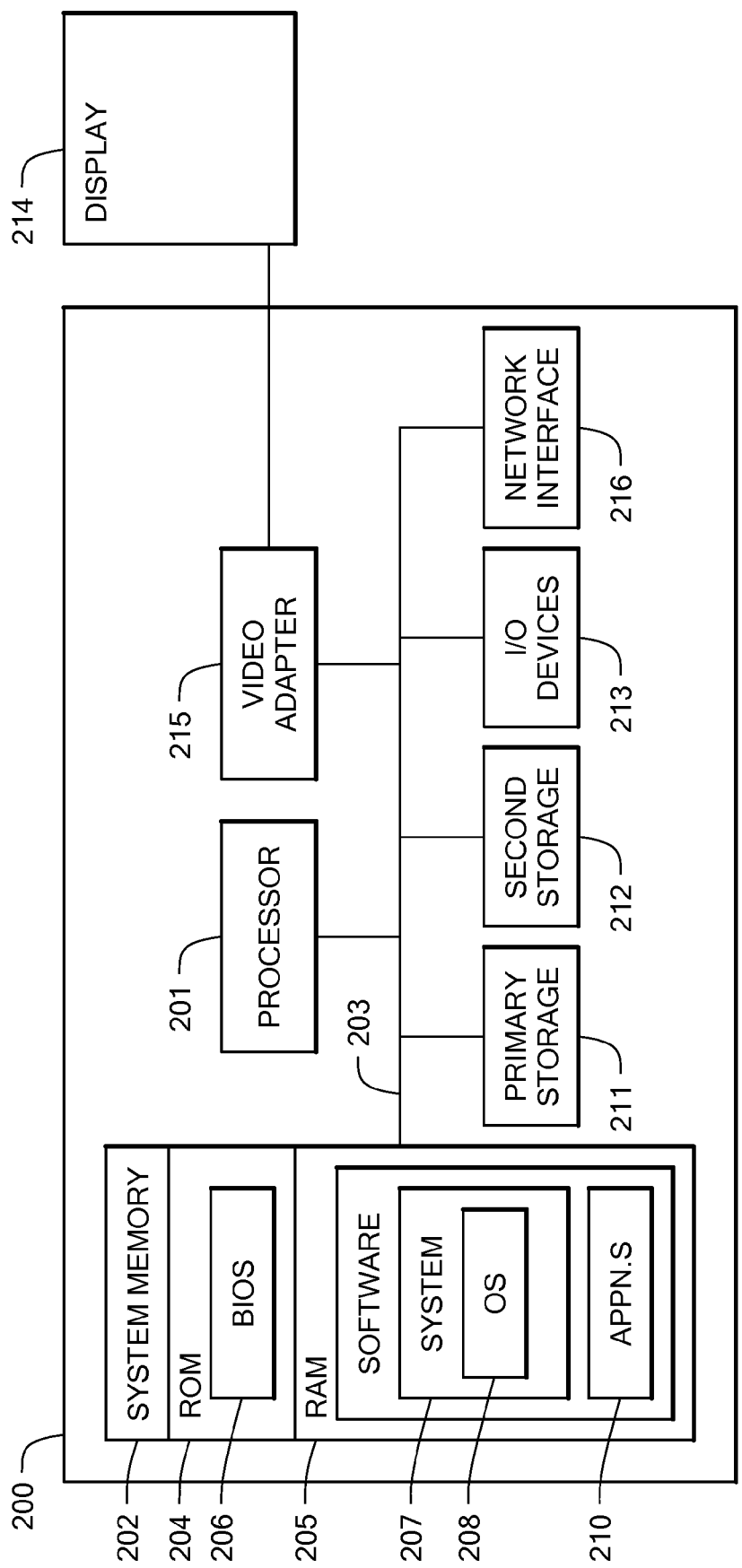
FIG. 2 is a block diagram of a computer system in which the present invention may be implemented.

Referring to FIG. 2, an exemplary system for implementing a client system 101, 102, or a server 103 is shown. The system is a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3A:
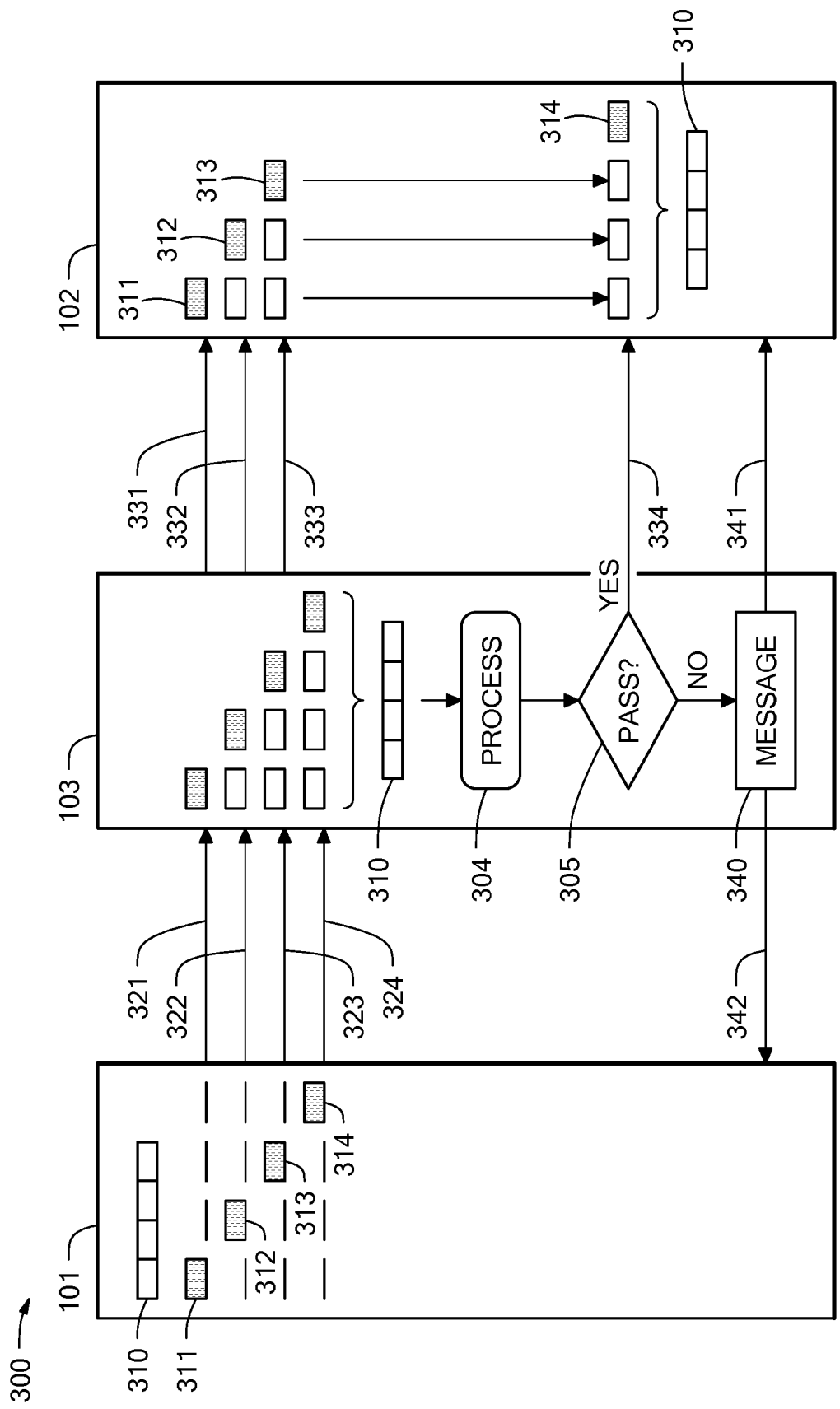
FIGS. 3A and 3B are schematic representations of methods of file transfer via a server in accordance with the present invention.
Figure 3B:
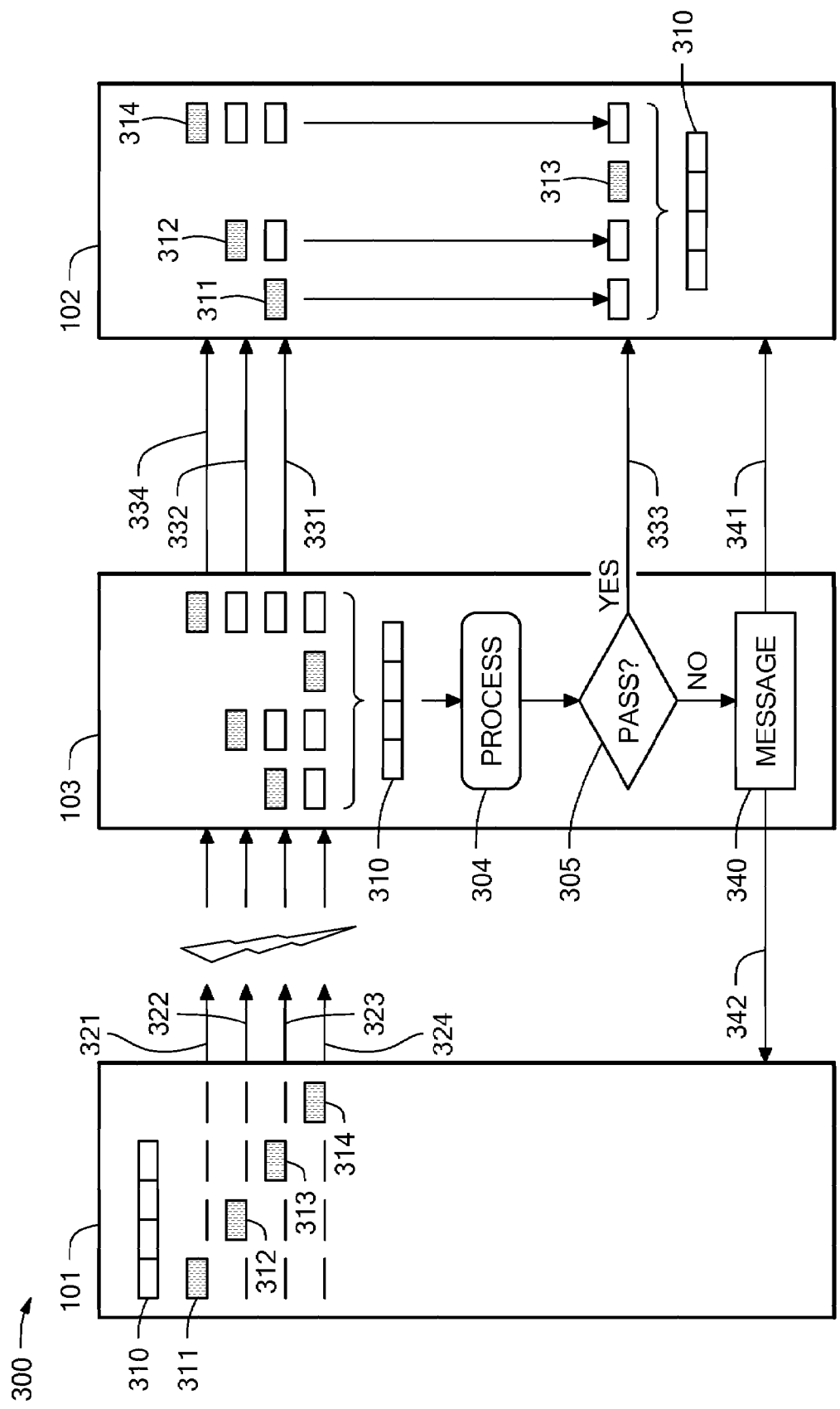

Referring to FIGS. 3A and 3B, schematic diagrams illustrate an embodiment of a method in accordance with the present invention. A source client 101 has a file 310 which it intends to send to a destination client 102. The file 310 is divided into segments 311-314. FIGS. 3A and 3B show the segments 311-314 as all being of the same size. Transfer delay times may be shortened further by using a variable segment size.

FIG. 3A shows the segments 311-314 are sequential in their position in the file 310. A first segment 311 is sent 321 to the server 103. The first segment 311 is stored on the server 103. The first segment 311 is also sent 331 from the server 103 to the destination client 102. When a first segment 311 is received at the server 103 or at the destination client 102, it is appended to an initially empty file.

The second segment 312 is sent 322 to the server 103 where it is stored. The second segment 312 is sent 332 from the server 103 to the destination client 102. When the second segment 312 is received at the server 103 or at the destination client 102, it is appended to the file containing the first segment 311.

The same process is carried out for the third segment 313. The third segment is sent 323 to the server 103 where it is stored. The third segment 313 is sent 333 from the server 103 to the destination client 102. When the third segment 313 is received at the server 103 or at the destination client 102, it is appended to the file containing the first and second segments 311, 312.

The server 103 recognizes that there is only one remaining segment required for the file to be complete. This may be achieved in various ways, such as a count of segments, a monitor of the appended file size at the server 103, or an indication provided on the last segment itself.

The fourth and last segment 314 is sent 324 to the server 103 where it is stored. It is appended to the file already containing the first, second and third segments 311-313 to form the whole file 310. The last segment 314 is not immediately sent to the destination client 102.

The required process 304 is carried out on the whole re-combined file 310. It is determined 305 if the file 310 has passed the process. If the file 310 has passed the process 304, it is again divided into segments 311-314 and the last segment 314 is sent 334 to the destination client 102.

At the destination client 102, the fourth segment 314 is appended to the file containing the previously received first, second, and third segments 311-313 to re-form the file 310 and to complete the transfer. The file 310 is then available to the destination client 102.

If the process is not passed by the file 310, a message is sent by the server 103 to the source client 101 and the destination client 102 that the file transfer has failed.

FIG. 3A shows an embodiment of ordinal order passing of segments. However, many transfer protocols do not transfer segments in order. FIG. 3B shows an alternative embodiment in which the segments 311-314 may be sent in sequence 321-324, however they are received at the server 103 in random order. In a further embodiment, the segments 311-314 may be sent in any order, including randomly.

Referring to FIG. 3B, the first segment to be received at the server 103, namely segment 314, is stored on the server 103 and the segment 314 is also forwarded 334 to the destination client 102. A second received segment 312 is received at the server 103, the segment 312 is stored on the server 103 and also forwarded to the destination client 102. A third received segment 311 is received at the server 103, the segment 311 is stored on the server 103 and also forwarded to the destination client 102.

The final segment to be received, namely segment 313 is stored on the server 103. The final segment to be received 313 is not forwarded to the destination client 102 when it arrives at the server 103.

The segments 311-314 may be appended to a file as they are received at the server 103, or the server may re-form the file from the stored segments 311-314 once the final segment has been received at the server 103.

As in FIG. 3A, the required process 304 is carried out on the whole re-combined file 310. It is determined 305 if the file 310 has passed the process. If the file 310 has passed the process 304, it is again divided into segments 311-314 and the final segment that was received 313 is identified and is sent 333 to the destination client 102.

At the destination client 102, the final segment 313 is appended to the file containing the previously received segments 311, 312, 314 to re-form the file 310 and to complete the transfer. The file 310 is then available to the destination client 102.

If the process is not passed by the file 310, a message is sent by the server 103 to the source client 101 and the destination client 102 that the file transfer has failed.

Figure 4:
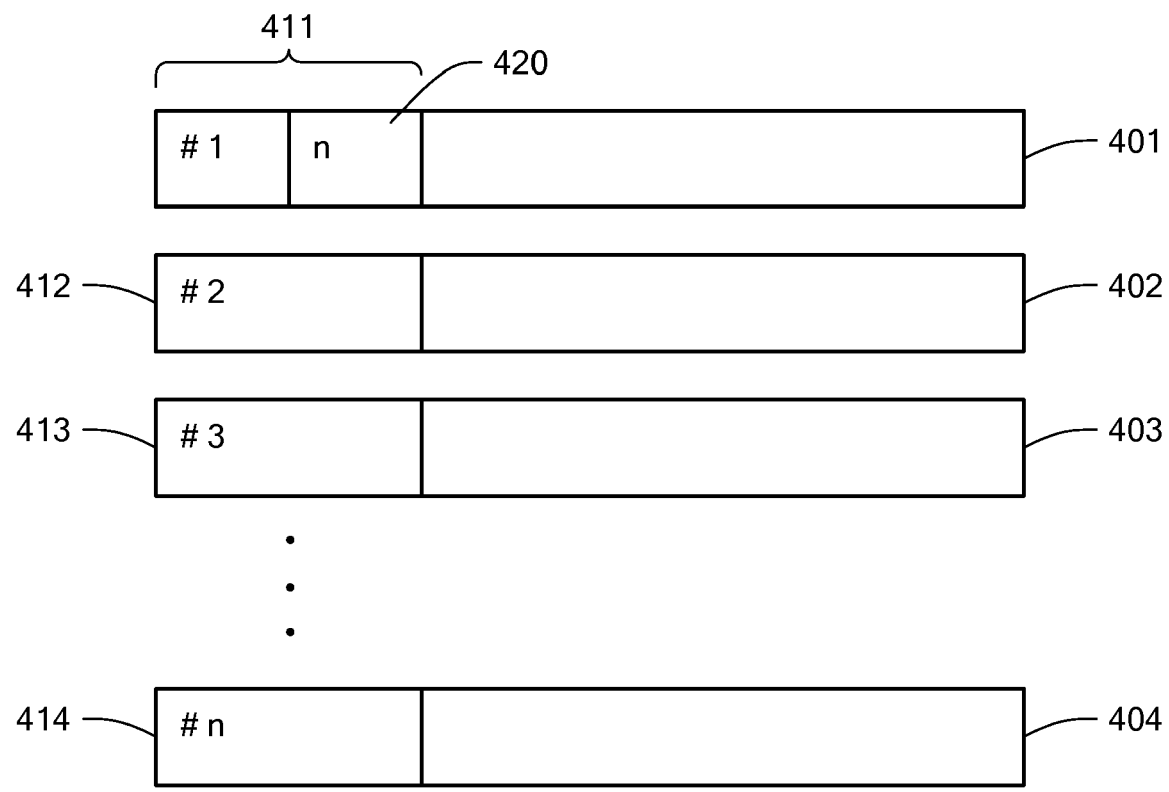
FIG. 4 is a schematic representation of segments of a file in accordance with the present invention.

FIG. 4 shows a schematic diagram of example segments of a file. A file is divided into n segments 401-404. Each segment 401-404 has a header 411-414 added to it. The headers 411-414 may be, for example, of one word size. The header 411-414 of each segment 401-404 includes an ordinal number of the segment 401-404. As an alternative to an ordinal number, the header may include another form of address of the position of the segment in the file. One of the segments (for example, the first segment 401) includes the total number 420 of segments in the file. This may be included together with the ordinal number in a single word as the header of the segment.

The server keeps each segment, and sends it to the destination client, except for the last segment arrives. The last segment is identified because the first segment includes the total number of segments. Even if the first segment is the last to arrive, it can be identified as the last segment by counting all the segments.

In the example application of instant messaging, an instant messaging client A sends a 2 MB executable file to client B. The file is sent through a server. The file is split in the application layer into segments of 2 KB size each resulting in 1000 segments. Each segment is transferred by a TCP (Transmission Control Protocol) protocol to the server. The TCP protocol may split each segment due to its own limitations, but this appears seamless to the application layer. This example divides the file into segments of the same size. Alternative implementations may divide the file into variably sized segments in order to reduce transfer delay times. For example, the final segment to be transferred may be the smallest segment.

In another example application of a replication server, the segment size and the numbering may be different. Also, a different transfer protocol may be used (for example, UDP (User Datagram Protocol)).

Figure 5:
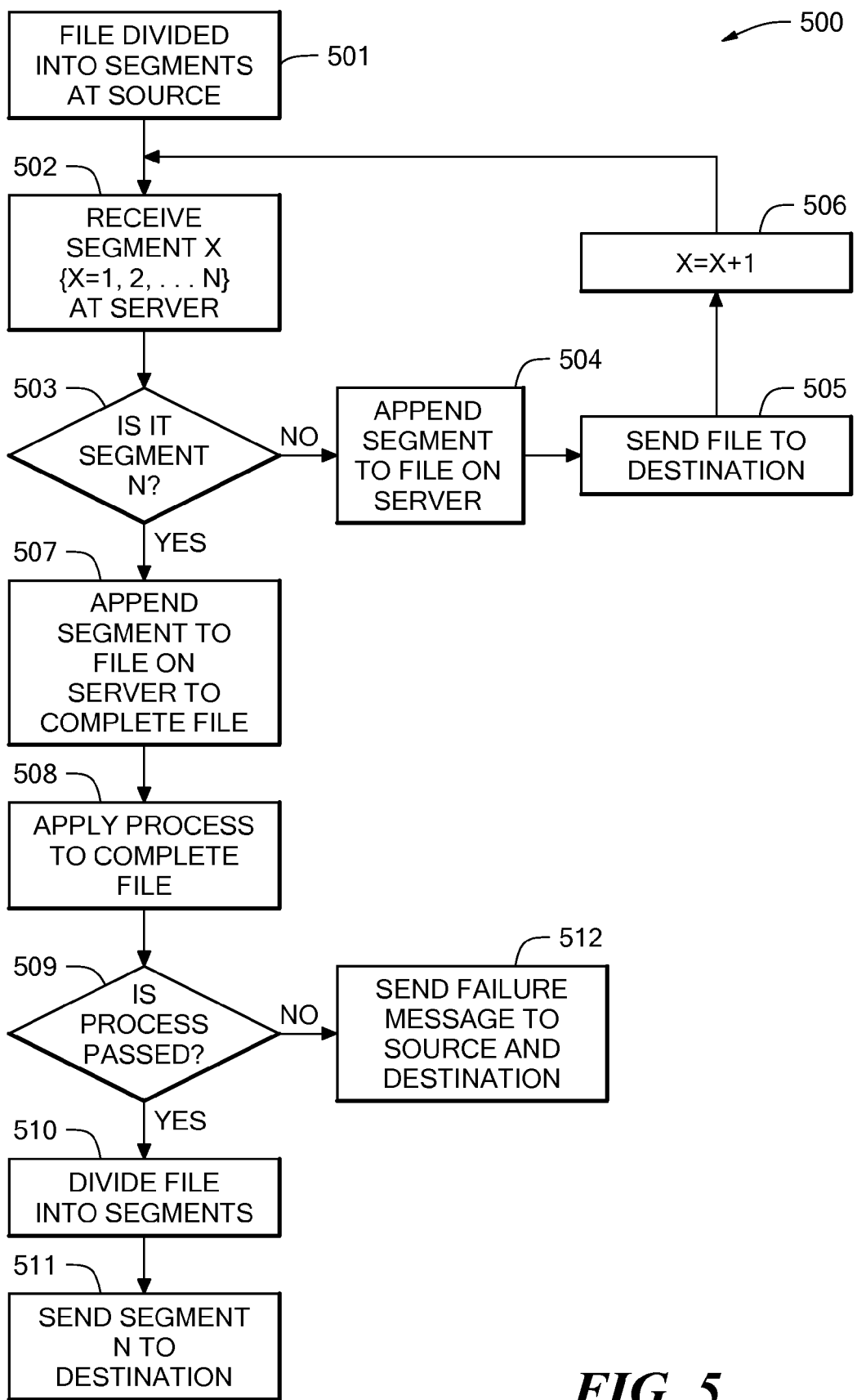
FIG. 5 is a flow diagram for a method of file transfer in accordance with the present invention.

FIG. 5 provides a flow diagram 500 of the described method. A file is first divided 501 into segments at the source client. Segment x {x=1, 2, . . . n} is sent 502 to the server. It is determined 503 at the server if the segment is segment n. If it is not segment n, the segment is appended 504 to a file on the server. The segment is also sent 505 to the destination client. The method then loops 506 for the next segment x=x+1.

If it is determined 503 that the segment is segment n, the segment is appended 507 to the file on the server to complete the file. The process is carried out 508 on the file. It is then determined 509 if the file passed the process. If so, the file is again divided into the segments 510 and the last segment is sent 511 to the destination client.

If it is determined 509 that the file has failed the process, a failure message is sent 512 to the source and destination clients and the transfer is aborted.

The described method and system transfer the majority of a file to a destination client before it has been processed by the server. In the case where the process is a anti-virus check of a file, portions of an infected file are received at the destination client. However, this will not risk infection of the destination client's computer system, as the file cannot be accessed by the destination client until all the file segments have been received.

The process carried out by the server may be any form of process required on a file before the destination client receives the file.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for file transfer, comprising:
receiving, by a middle server system, segments of a file from a source client computer system;
storing, by the middle server system, the segments of the file as they are received;
forwarding, by the middle server system, the segments of the file from the middle server system to a destination client system as they are received by the middle server system, excepting at least one segment of the file;
combining all the segments of the file in the middle server system to completely form the file in the middle server;
applying, by the middle server system, a confidentiality check process to the completely formed file in the middle server, wherein the confidentiality check process determines whether the completely formed file contains confidential information and whether the destination client system has a required confidentiality clearence for the completely formed file;

responsive to the middle server system determining that the completely formed file and destination client system pass the confidentiality check process, forwarding the excepted segment of the file from the middle server system to the destination client; and responsive to the middle server system determining that the completely formed file or the destination client system fails the confidentiality check process, forwarding a failure message to the destination client system instead of the excepted segment of the file.

2. The method of claim 1, wherein the source client system divides the file into segments and transmits the segments to the middle server system.

3. The method of claim 1, wherein the excepted segment is the last segment to be received.

4. The method of claim 1, wherein the segments are combined as they are received by the middle server system.

5. The method of claim 1, wherein the segments are received out of sequence order in the file and contain an indication of their position in the file.

6. The method of claim 1, wherein at least one of the segments includes an indication of the number of segments in the file.

7. The method of claim 1, wherein the excepted segment which is not to be forwarded on receipt is identified by a count of segments.

8. The method of claim 1, wherein the segments are forwarded to more than one destination client simultaneously.

9. A computer program product including a non-transitory computer readable storage medium, the non-transitory computer readable storage medium having program code stored thereon for file transfer, the program code comprising:

program code for receiving, by a middle server system, segments of a file from a source client system;

program code for storing, by the middle server system. the segments of the file as they are received;

program code for forwarding, by the middle server system, the segments of the file from the middle server system to a destination client system as they are received by the middle server system, excepting at least one segment of the file;

program code for combining, in the middle server system, all the segments of the file to completely form the file in the middle server;

program code for applying, by the middle server system, a confidentiality check process to the completely formed file in the middle server, wherein the confidentiality check process determines whether the completely formed file contains confidential information and whether the destination client system has a required confidentiality clearance for the completely formed file;

program code for, responsive to the middle server system determining that the completely formed file and the destination client system pass the confidentiality check process, forwarding the excepted segment of the file from the middle server system to the destination client system; and program code for, responsive to the middle server system determining that the completely formed file or the destination client system fails the confidentiality check process, forwarding a failure message to the destination client system instead of the excepted segment of the file.

10. A method of providing a service to a client over a network, comprising:

receiving, by a middle server system, segments of a file;

storing, by the middle server system, the segments of the file as they are received;

forwarding, by the middle server system, the segments of the file from the middle server system to a destination client system as they are received by the middle server system, excepting at least one segment of the file;

combining all the segments of the file in the middle server system to completely form the file in the middle server;

applying, by the middle server system, a confidentiality check process to the completely formed file in the middle server, wherein the confidentiality check process determines whether the completely formed file contains confidential information and whether the destination client system has a required confidentiality clearance for the completely formed file;

responsive to the middle server system determining that the completely formed file and the destination client system pass the confidentiality check process, forwarding the excepted segment of the file from the middle server system to the destination client system; and responsive to the middle server system determining that the completely formed file or the destination client system fails the confidentiality check process, forwarding a failure message to the destination client system instead of the excepted segment of the file.

11. A system for file transfer comprising:

a source client system including:
dividing means for dividing a file into segments, and
transmitting means for transmitting the segments of the file;

a destination client system including:
receiving means for receiving the segments of the file; and a middle server system including:
receiving means for receiving the segments of the file from the source client system,
a store for storing the segments of the file as they are received,
forwarding means for transmitting the segments of the file to the destination client system as they are received,
means for identifying an excepted one of the segments of the file which is not forwarded to the destination client system on receipt,
re-combining means for combining all the segments of the file to completely form the file,
a file processing means for applying a confidentiality check process to the completely formed file, wherein the confidentiality check process determines whether the completely formed file contains confidential information and whether the destination client system has a required confidentiality clearance for the completely formed file,
excepted segment forwarding means for, responsive to the middle server system determining that the completely formed file and the destination client system pass the confidentiality check process, forwarding the excepted one of the segments of the file from the middle server system to the destination client system, and
failure message forwarding means for, responsive to the middle server system determining that the completely formed file or the destination client system fails the confidentiality check process, forwarding a failure message to the destination client system instead of the excepted one of the segments of the file.

12. The system of claim 11, wherein the middle server system includes a dividing means for dividing the whole file into segments once it has passed the process.

13. The system of claim 12, wherein the dividing means of the source client system and the middle server system use the same dividing method to provide the same file segments.

14. The system of claim 11, wherein the destination client system includes a re-combining means for combining the file segments into the whole file.

15. The system of claim 11, wherein there is more than one destination client system and the middle server system forwards the file segments to the destination client systems simultaneously.

16. The system of claim 11, wherein the system for file transfer is an instant messaging system and the source and destination client systems include instant messaging clients.

17. The system of claim 11, wherein the system for file transfer is a file sharing system and the source and destination client systems include file sharing applications.

18. The system of claim 11, wherein the system for file transfer is a file replication system and the middle server system includes a replication server.

* * * * *